United States Patent
Lan (10) Patent No.: US 7,311,323 B1
(45) Date of Patent: Dec. 25, 2007

(54) STROLLER HAVING A FOLDABLE HANDLE FRAME CAPABLE OF BEING AUTOMATICALLY LOCKED IN A FOLDED STATE

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 11/614,077

(22) Filed: Dec. 20, 2006

(51) Int. Cl.
*B62B 7/00* (2006.01)

(52) U.S. Cl. ............... 280/642; 280/624; 280/641; 280/38; 280/639; 280/9; 280/20; 280/32.6; 280/47.25

(58) Field of Classification Search ......... 280/624, 280/642, 641, 38, 639, 9, 20, 32.6, 47.25
See application file for complete search history.

(56) References Cited

U.S. PATENT DOCUMENTS

| | | | | |
|---|---|---|---|---|
| 5,772,235 A | * | 6/1998 | Espenshade | 280/643 |
| 6,877,761 B2 | * | 4/2005 | Hsia | 280/642 |
| 6,893,031 B2 | * | 5/2005 | Suzuki | 280/47.36 |
| 6,908,101 B2 | * | 6/2005 | Chen | 280/642 |
| 6,991,248 B2 | * | 1/2006 | Valdez et al. | 280/647 |
| 7,229,091 B2 | * | 6/2007 | Lan | 280/642 |
| 7,267,359 B1 | * | 9/2007 | Yang et al. | 280/642 |
| 2002/0175498 A1 | * | 11/2002 | Yang et al. | 280/648 |
| 2006/0066077 A1 | * | 3/2006 | Espenshade et al. | 280/642 |

* cited by examiner

*Primary Examiner*—Christopher P. Ellis
*Assistant Examiner*—Cynthia F. Collado
(74) *Attorney, Agent, or Firm*—Janah & Associates (57) ABSTRACT

A stroller includes a wheel frame and a handle frame. The handle frame includes a grip member and two swing rods. The swing rods are spaced apart from each other in a left-to-right direction, and are connected pivotally to the wheel frame. The grip member has two extension rod portions that are connected respectively and pivotally to the swing rods so as to allow the grip member to be folded on the swing rods. Two slide sleeves are sleeved respectively and movably on the extension rod portions. Two rod-retaining seats are disposed respectively on the slide sleeves, and engage respectively and automatically retaining grooves in the swing rods so as to prevent the grip member from pivoting upwardly away from the swing rods when the grip member is folded on the swing rods.

8 Claims, 10 Drawing Sheets

ID A STROLLER HAVING A FOLDABLE HANDLE FRAME CAPABLE OF BEING AUTOMATICALLY LOCKED IN A FOLDED STATE

BACKGROUND OF THE INVENTION

1. Field of the Invention

This invention relates to a stroller, and more particularly to a stroller that has a handle frame, which can be automatically locked in a folded state.

2. Description of the Related Art

Figure 1:
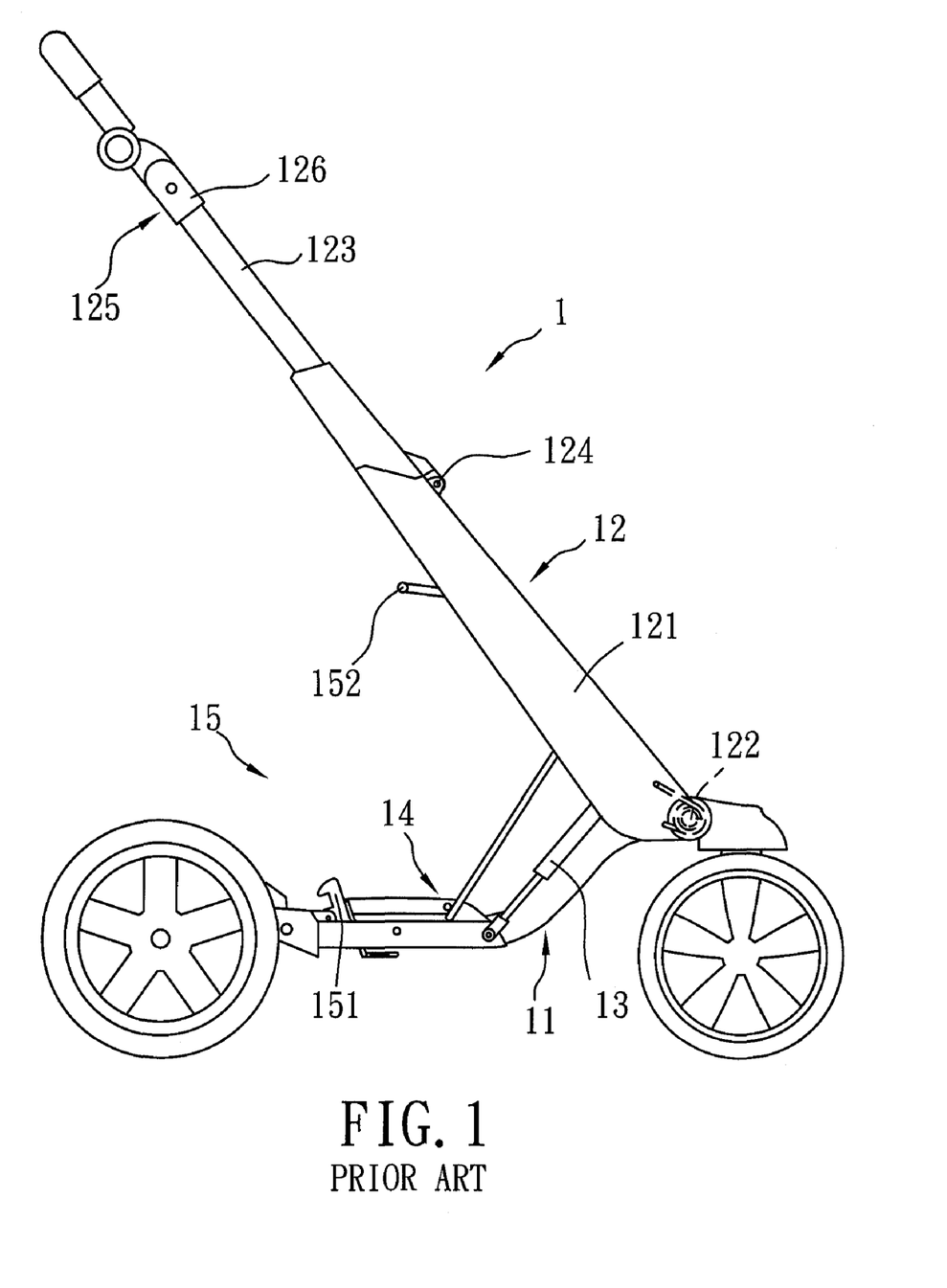
FIG. 1 is a schematic side view of a conventional stroller disclosed in Chinese Utility Model Number ZL 200520016368.3 in an unfolded state.
Figure 2:
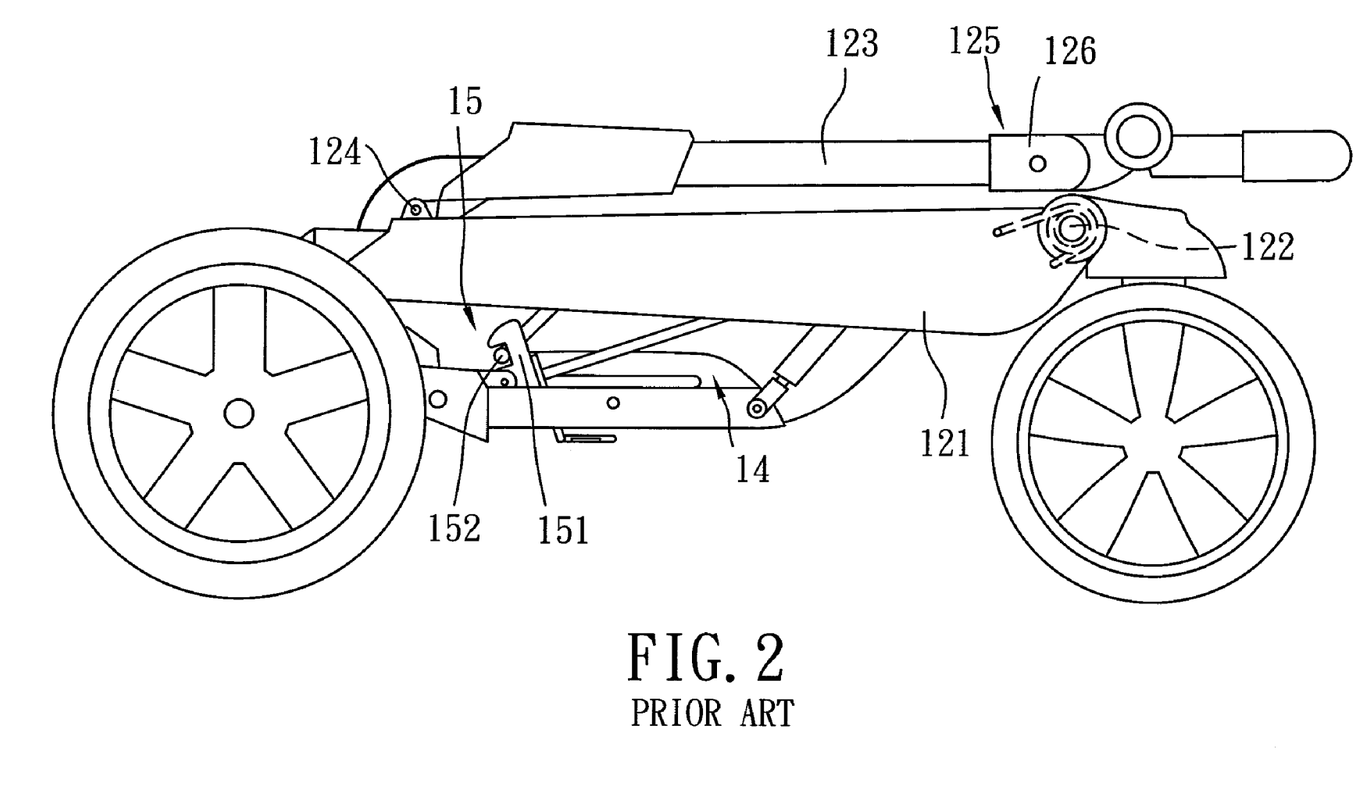
FIG. 2 is a schematic side view of the conventional stroller in a folded state.

Referring to FIGS. 1 and 2, a conventional stroller 1 disclosed in Chinese Utility Model Number ZL 200520016368.3 by the applicant includes a wheel frame 11, a foldable handle frame 12, a separating mechanism 13, two strut assemblies 14 disposed between the wheel frame 11 and the handle frame 12 for maintaining the handle frame 12 in an unfolded state, and two retaining mechanisms 15. Each of the retaining mechanisms 15 includes a retaining hook 151 attached to a rear end portion of the wheel frame 11, and a retainer 152 attached to the handle frame 12. Since the separating mechanism 13 and the strut assemblies 14 are not pertinent to the improvement of this invention, a detailed description thereof will be omitted.

The handle frame 12 includes two swing rods 121 spaced apart from each other in a left-to-right direction, two first pivot pins 122 each connecting the corresponding wing rod 121 to the wheel frame 11, a U-shaped grip member 123, two second pivot pins 124 each connecting the grip member 123 to the corresponding swing rod 121, and two folding control mechanisms 125. Each of the folding control mechanisms 125 includes a slide sleeve 126 sleeved movably on the grip member 123. When the stroller 1 is unfolded, the handle frame 12 is inclined rearwardly and upwardly, as shown in FIG. 1.

When it is desired to fold the stroller 1, the slide sleeves 126 are pulled upwardly so as to activate the strut assemblies 14, thereby allowing downward pivoting movement of the swing rods 121 about the first pivot pins 122 and downward pivoting movement of the grip member 123 about the second pivot pins 124. When the swing rods 121 pivot to horizontal positions, the retaining hooks 151 engage respectively the retainers 152 so as to prevent upward pivoting movement of the swing rods 121. When the stroller 1 is folded fully, the grip member 123 is horizontal, as shown in FIG. 2. In this state, however, the grip member 123 may pivot relative to the swing rods 121, thereby resulting in difficulties during packing and carrying of the stroller 1.

SUMMARY OF THE INVENTION

The object of this invention is to provide a stroller that includes a foldable handle frame, which is capable of being automatically locked in a folded state.

According to this invention, a stroller includes a wheel frame and a handle frame. The handle frame includes a grip member and two swing rods. The swing rods are spaced apart from each other in a left-to-right direction, and are connected pivotally to the wheel frame. The grip member has two extension rod portions that are connected respectively and pivotally to the swing rods so as to allow the grip member to be folded on the swing rods. Two slide sleeves are sleeved respectively and movably on the extension rod portions. Two rod-retaining seats are disposed respectively on the slide sleeves, and engage respectively and automatically retaining grooves in the swing rods so as to prevent the grip member from pivoting upwardly away from the swing rods when the grip member is folded on the swing rods.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 3:
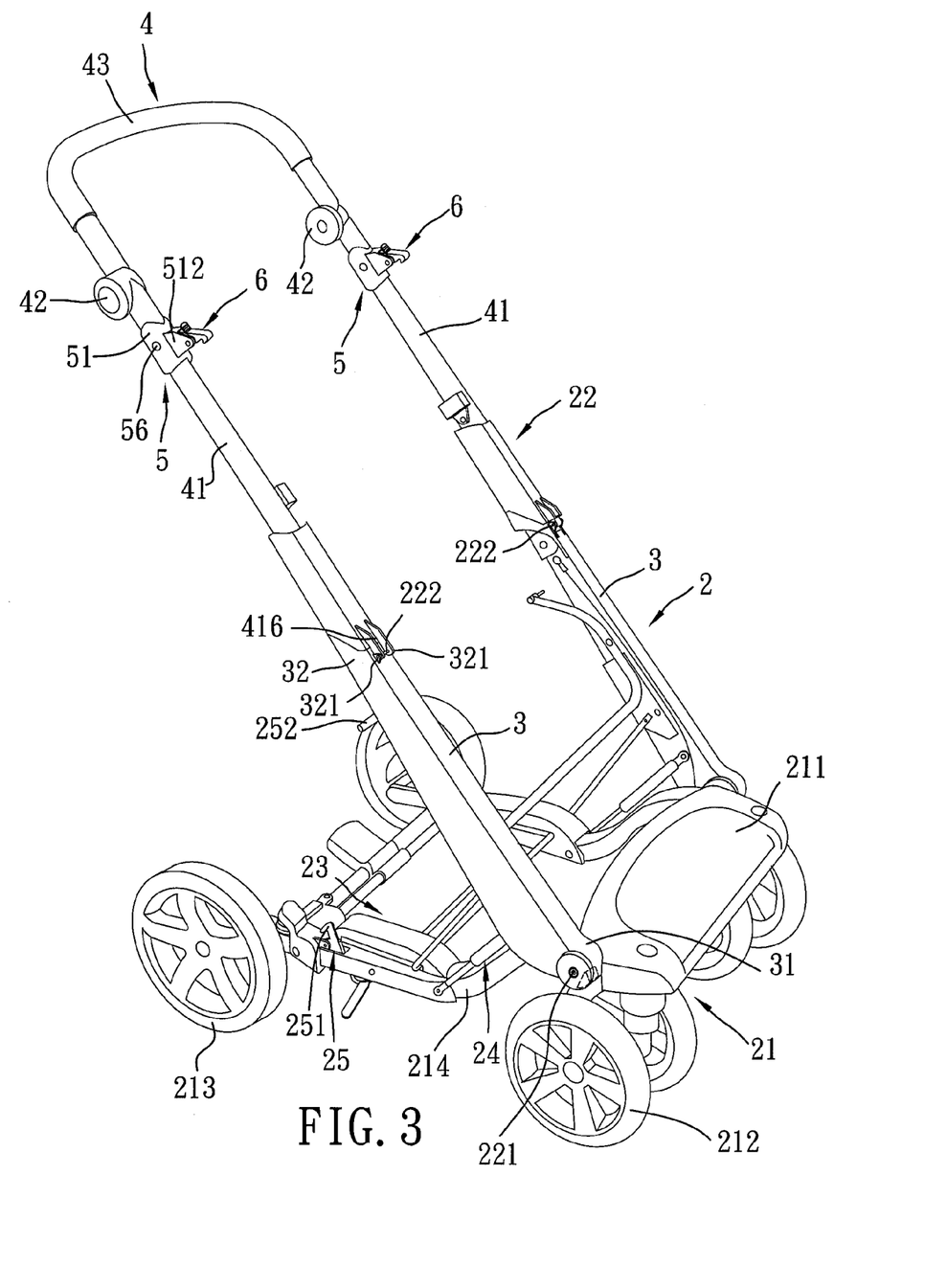
FIG. 3 is a perspective view of the preferred embodiment of a stroller according to this invention in an unfolded state.
Figure 4:
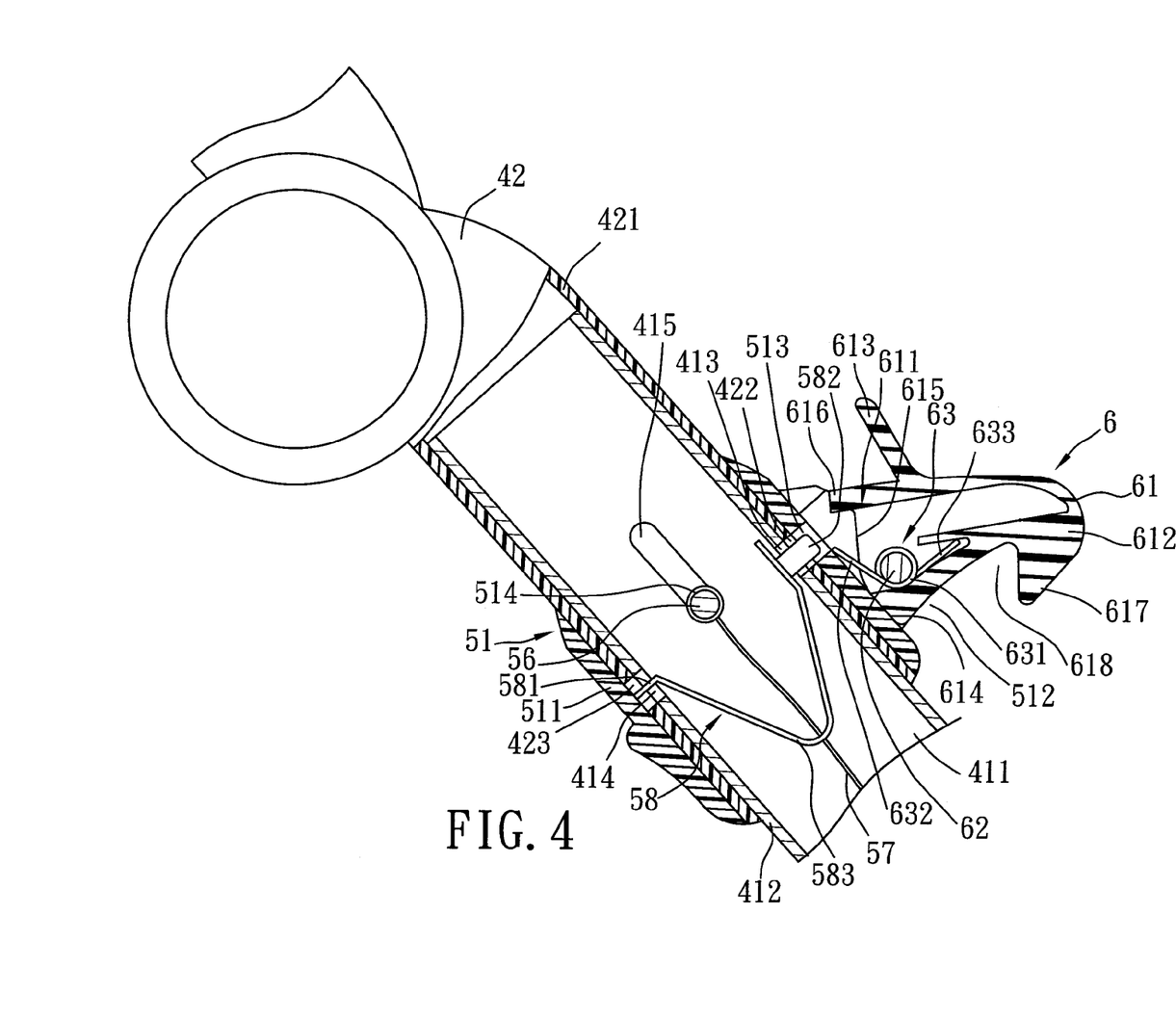
FIG. 4 is a fragmentary sectional view of the preferred embodiment, illustrating a sleeve-locking position of a rod-retaining seat.
Figure 5:
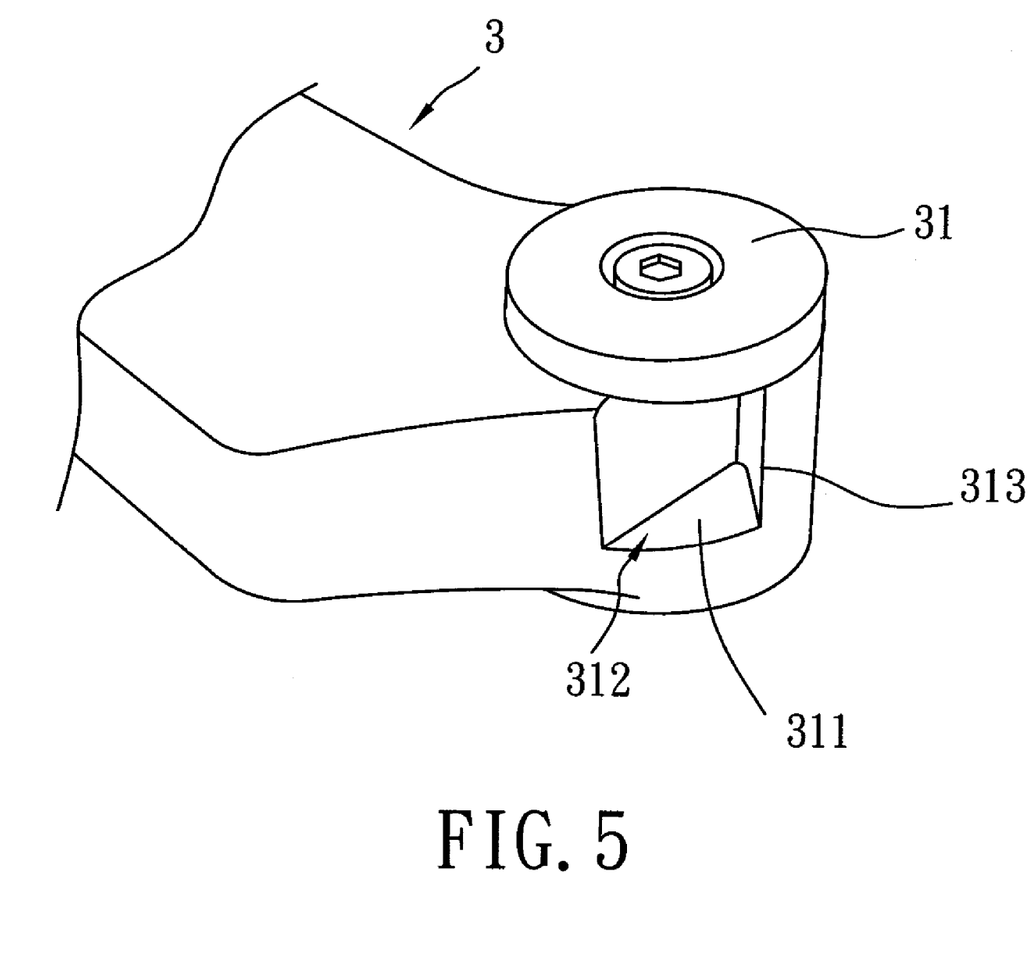
FIG. 5 is a fragmentary perspective view of the preferred embodiment, illustrating a pivot end of a swing rod.

Referring to FIGS. 3, 4, and 5, the preferred embodiment of a stroller according to this invention includes a wheel frame 21, a foldable handle frame 22, a strut mechanism 23, a separating mechanism 24, and two retaining mechanisms 25.

The wheel frame 21 includes a front wheel seat 211, a front wheel unit 212 disposed under the front wheel seat 211, a rear wheel unit 213, and a mounting seat 214 disposed between the front and rear wheel units 212, 213. The strut mechanism 23 is disposed between the mounting seat 214 and the handle frame 22 for maintaining an angle between the handle frame 22 and the wheel frame 21. Each of the retaining mechanisms 25 includes a handle-retaining seat 251 attached to the mounting seat 214, and a retainer 252 attached to the handle frame 22. When the handle frame 22 is pivoted toward the wheel frame 21, the retainers 252 engage respectively the handle-retaining seats 251 so as to lock the stroller in a folded state. Since the structures and operations of the strut mechanism 23, the separating mechanism 24, and the retaining mechanism 25 are not pertinent to the improvement of this invention, a detailed description thereof will be omitted herein.

The handle frame 22 includes two swing rods 3 spaced apart from each other in a left-to-right direction and pivotable toward and away from the mounting seat 214, two first pivot pins 221 each connecting the corresponding swing rod 3 to the wheel frame 21, a U-shaped grip member 4 having two parallel extension rod portions 41, two second pivot pins 222 each connecting the corresponding extension rod portion 41 of the grip member 4 to the corresponding swing rod 3 so as to allow the grip member 4 to be folded on the swing rods 3, two folding control mechanisms 5, and two rod-retaining mechanisms 6.

Each of the swing rods 3 has a pivot end 31 connected to the wheel frame 21 by the corresponding first pivot pin 221, and a grip-connecting end 32 opposite to the pivot end 31. The retainers 252 of the retaining mechanisms 25 are attached respectively to the swing rods 3 of the handle frame 22. Each of the pivot ends 31 has a retaining groove 311 defined by a wall 312 that is formed with a retaining rod 313 at a front end thereof. Each of the grip-retaining ends 32 is formed with two parallel lugs 321, through which the corresponding second pivot pin 222 extends.

Figure 6:
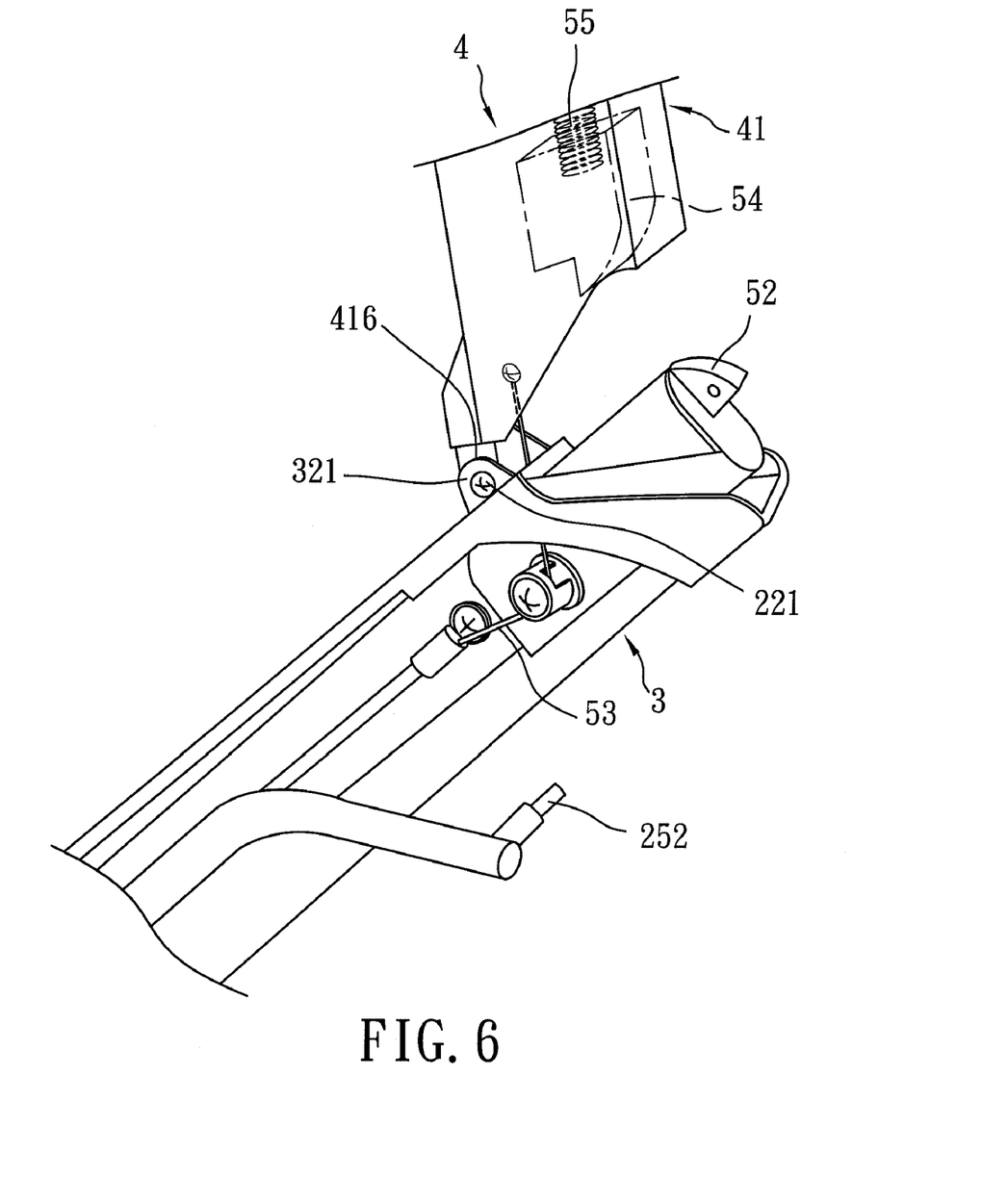
FIG. 6 is a fragmentary perspective view of the preferred embodiment, illustrating a portion of a folding control mechanism.

With further reference to FIG. 6, the grip member 4 further has two connecting portions 42 sleeved respectively and fixedly on top ends of the extension rod portions 41, and a grip portion 43 interconnecting fixedly the connecting portions 42. Each of the extension rod portions 41 has a passage 411 defined by a surrounding wall 412 inserted into a connecting wall 421 of the corresponding connecting portion 42. Each of the surrounding walls 412 has a first retaining hole 413, a first positioning hole 414 disposed behind the first retaining hole 413, and two aligned slide slots 415. Each of the extension rod portions 41 further has a lower end 416 inserted between the lugs 321 of the corresponding swing rod 3 and permitting extension of the corresponding second pivot pin 222 therethrough. The connecting wall 421 of each of the connecting portions 42 has a second retaining hole 422 aligned with the first retaining hole 413, and a second positioning hole 423 aligned with the second positioning hole 414.

Figure 8:
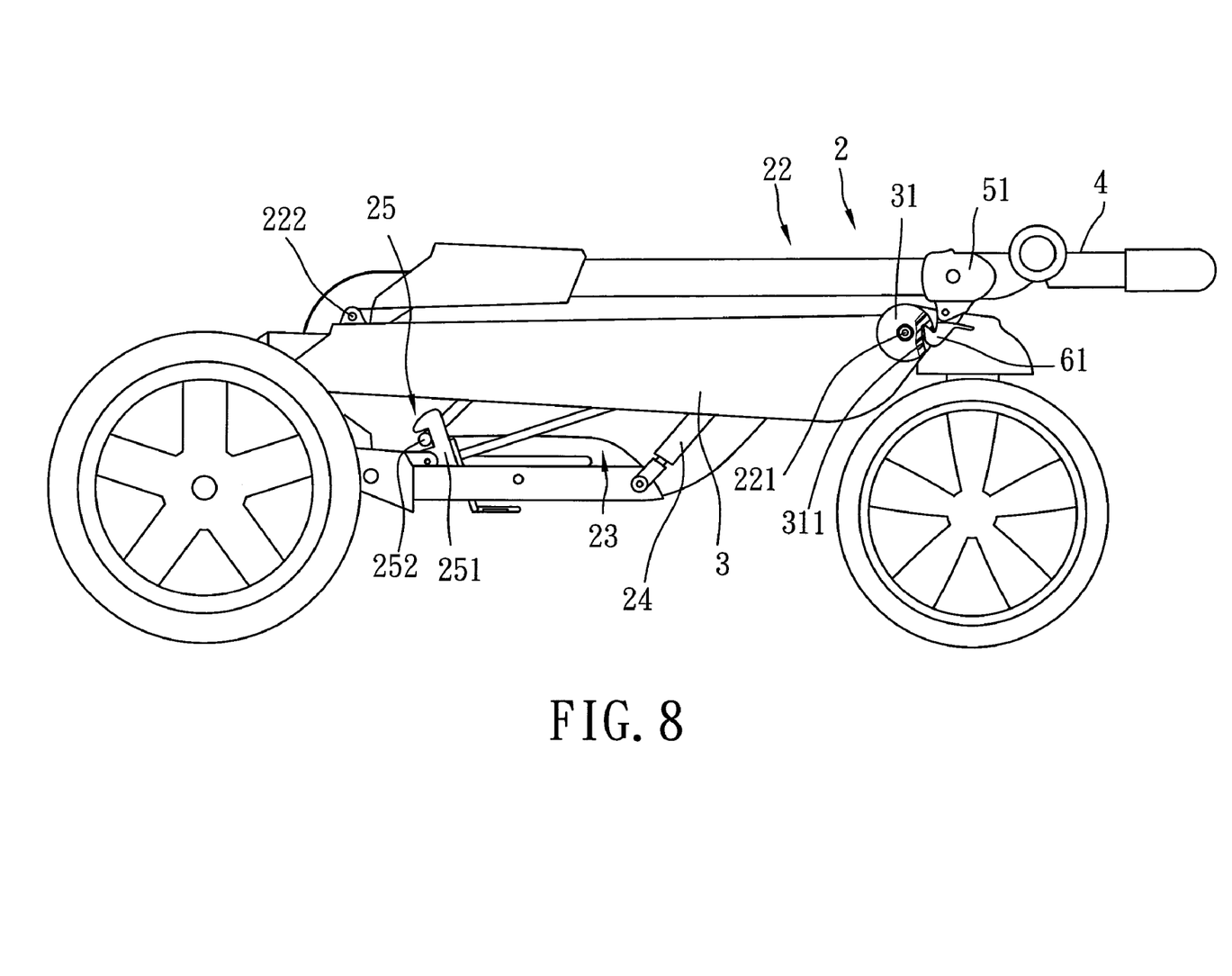
FIG. 8 is a schematic side view of the preferred embodiment in a folded state.

The folding control mechanisms 5 are used to maintain the handle frame 22 in an unfolded position shown in FIG. 3, and are operable to allow the handle frame 22 to be converted into a folded position shown in FIG. 8. Each of the folding control mechanisms 5 includes a slide sleeve 51 sleeved movably on the corresponding extension rod portion 41, a retaining block 52 disposed fixedly on a top end of the grip-connecting end 32 of the corresponding swing rod 3, a first pull cable 53 interconnecting the strut mechanism 23 and the grip member 4, a sliding block 54 disposed movably within the passage 411 in the corresponding extension rod portion 41, a spring 55 for biasing the sliding block 54 to engage the retaining block 52, a driving rod 56 disposed movably in the slide slots 415 in the corresponding extension rod portion 411, a second pull cable 57 interconnecting the driving rod 56 and the sliding block 54, and a spring member 58 disposed in the passage 411 in the corresponding extension rod portion 41.

Each of the slide sleeves 51 has a surrounding wall 511 disposed around the corresponding extension rod portion 41, and two pivot plates 512 extending from the surrounding wall 511. Each of the surrounding walls 511 is formed with a retaining hole 513 disposed between the corresponding pivot plates 512, and two rod holes 514 aligned with the slide slots 415 of the corresponding extension rod portion 41. Each of the driving rods 56 extends through the slide slots 415 of the corresponding extension rod portion 41, and has two end portions disposed fixedly within the rod holes 514 in the corresponding surrounding wall 511. Each of the spring members 58 is configured as a reed spring, and has a positioning portion 581 inserted into the corresponding first and second positioning holes 414, 423, a retaining portion 582 inserted into the corresponding first and second retaining holes 413, 422 and the corresponding retaining hole 513, and a V-shaped biasing portion 583 interconnecting the positioning portion 581 and the retaining portion 582. Each of the second pull cables 57 is operable to allow for removal of the corresponding sliding block 54 from the corresponding retaining block 52, as shown in FIG. 6. When the sliding blocks 54 are removed respectively from the retaining blocks 52, downward pivoting movement of the grip member 4 relative to the swing rods 3 is allowed. When the grip member 4 pivots downwardly relative to the swing rods 3, the first pull cable 53 and, thus, the strut mechanism 23 are activated so as to allow for downward pivoting movement of the swing rods 3 relative to the wheel frame 21. Since such activation of the first pull cable 53 and the strut mechanism 23 is described in Chinese Utility Model Number ZL 200520016368.3, a detailed description thereof will be omitted herein.

Each of the rod-retaining mechanisms 6 includes a rod-retaining seat 61, a pivot shaft 62 for connecting the rod-retaining seat 61 rotatably to the pivot plates 512 of the corresponding slide sleeve 51, and a resilient member 63 in the form of a torsional spring. Each of the rod-retaining seats 61 includes a sleeve-engaging portion 611 disposed between the pivot plates 512, a hook portion 612 extending forwardly from the sleeve-engaging portion 611, and an inclined actuation portion 613 extending rearwardly and upwardly from the sleeve-engaging portion 611. Each of the sleeve-engaging portions 611 has a pair of first and second abutment surfaces 614, 615 that are interconnected and that form an angle therebetween, and a pushing portion 616 extending rearwardly therefrom. Each of the hook portions 613 has a hook end 617 defining an engaging groove 618. Each of the resilient members 63 has a sleeve portion 631 sleeved on the corresponding pivot shaft 62, a first end 632 abutting against the surrounding wall 512 of the corresponding slide sleeve 51, and a second end 633 abutting against the corresponding sleeve-engaging portion 611. As such, each of rod-retaining seats 61 is biased by the corresponding resilient member 63 to pivot downwardly to a sleeve-locking position shown in FIG. 4. In the sleeve-locking position, the corresponding pushing portion 616 is disposed outwardly of the corresponding slide sleeve 51, the corresponding first abutment surface 614 is in contact with the surrounding wall 511 of the corresponding slide sleeve 51, the second abutment surface 615 is spaced apart from the surrounding wall 511 of the corresponding slide sleeve 51, and the retaining portion 582 of the corresponding spring member 58 engages the retaining hole 513 in the corresponding slide sleeve 51 so as to lock the corresponding slide sleeve 51 on the handle frame 22.

When the stroller is unfolded, as shown in FIGS. 3 and 4, the swing rods 3 and the grip member 4 of the handle frame 22 are inclined rearwardly and upwardly, and are aligned with each other. In this state, since the rod-retaining seats 61 are disposed in the sleeve-locking positions, the sleeves 51 cannot be moved on the handle frame 22.

Figure 7:
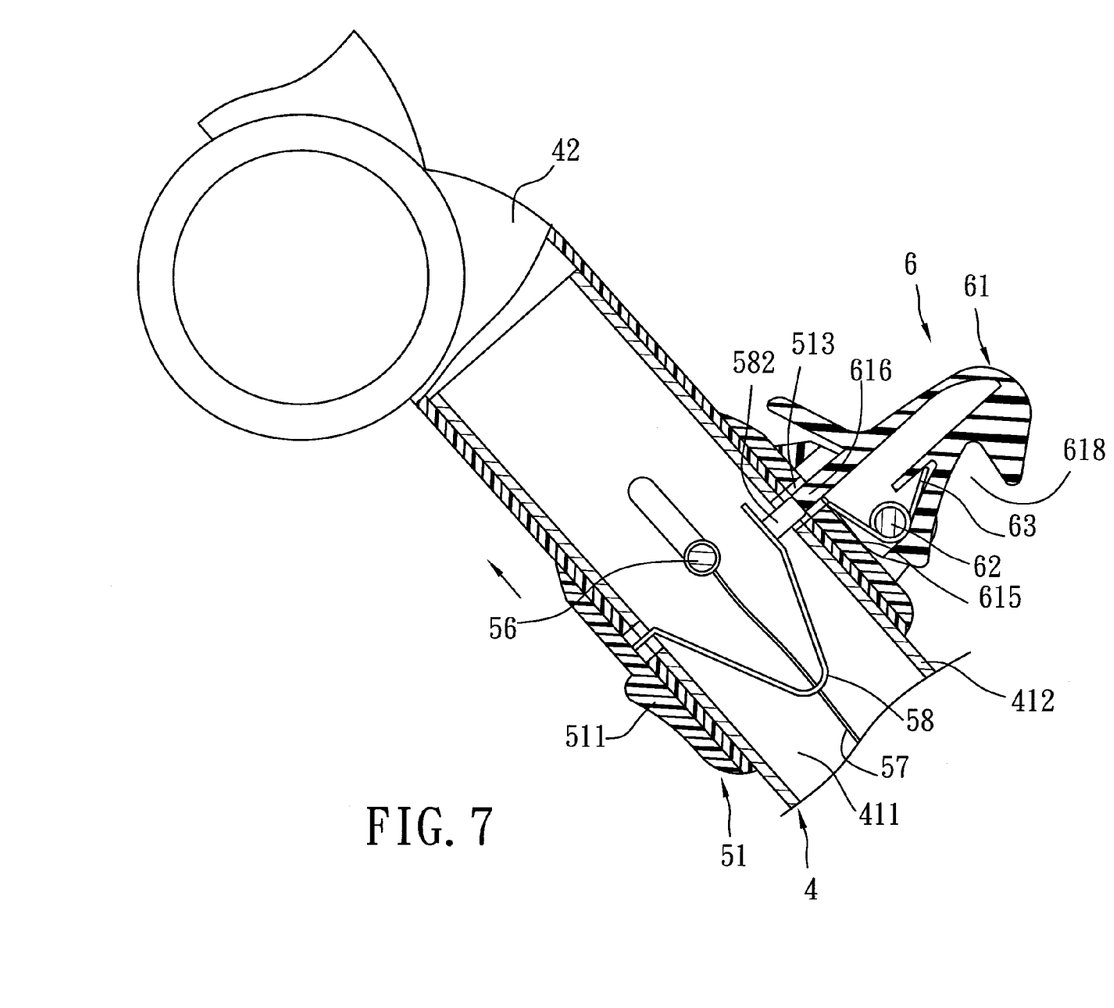
FIG. 7 is a fragmentary sectional view of the preferred embodiment, illustrating a sleeve-releasing position of the rod-retaining seat.

With additional reference to FIGS. 7 and 8, when it is desired to fold the stroller, the slide sleeves 51 are grasped by two hands, respectively, and the actuation portions 613 are pushed downwardly by the thumbs against the biasing action of the resilient members 63. Hence, each of the rod-retaining seats 61 is pivoted to a sleeve-releasing position shown in FIG. 7. In the sleeve-releasing position, the corresponding first abutment surface 614 is removed from the surrounding wall 511 of the corresponding slide sleeve 51, the corresponding second abutment surface 615 is in contact with the surrounding wall 511 of the corresponding slide sleeve 51, and the corresponding pushing portion 616 is pivoted into the retaining hole 513 in the corresponding slide sleeve 51 to thereby remove the retaining portion 582 of the corresponding spring member 58 from the retaining hole 513 in the corresponding slide sleeve 51. Thus, the slide sleeves 51 are released respectively from the extension rod portions 41. Subsequently, the slide sleeves 51 are moved respectively and upwardly on the handle frame 22 so as to activate the driving rods 56 and the second pull cables 57, thereby removing the sliding blocks 54 from the retaining blocks 52, respectively. As such, downward pivoting movement of the swing rods 3 relative to the wheel frame 21, and downward pivoting movement of the grip member 4 relative to the swing rods 3 are allowed.

Figure 9:
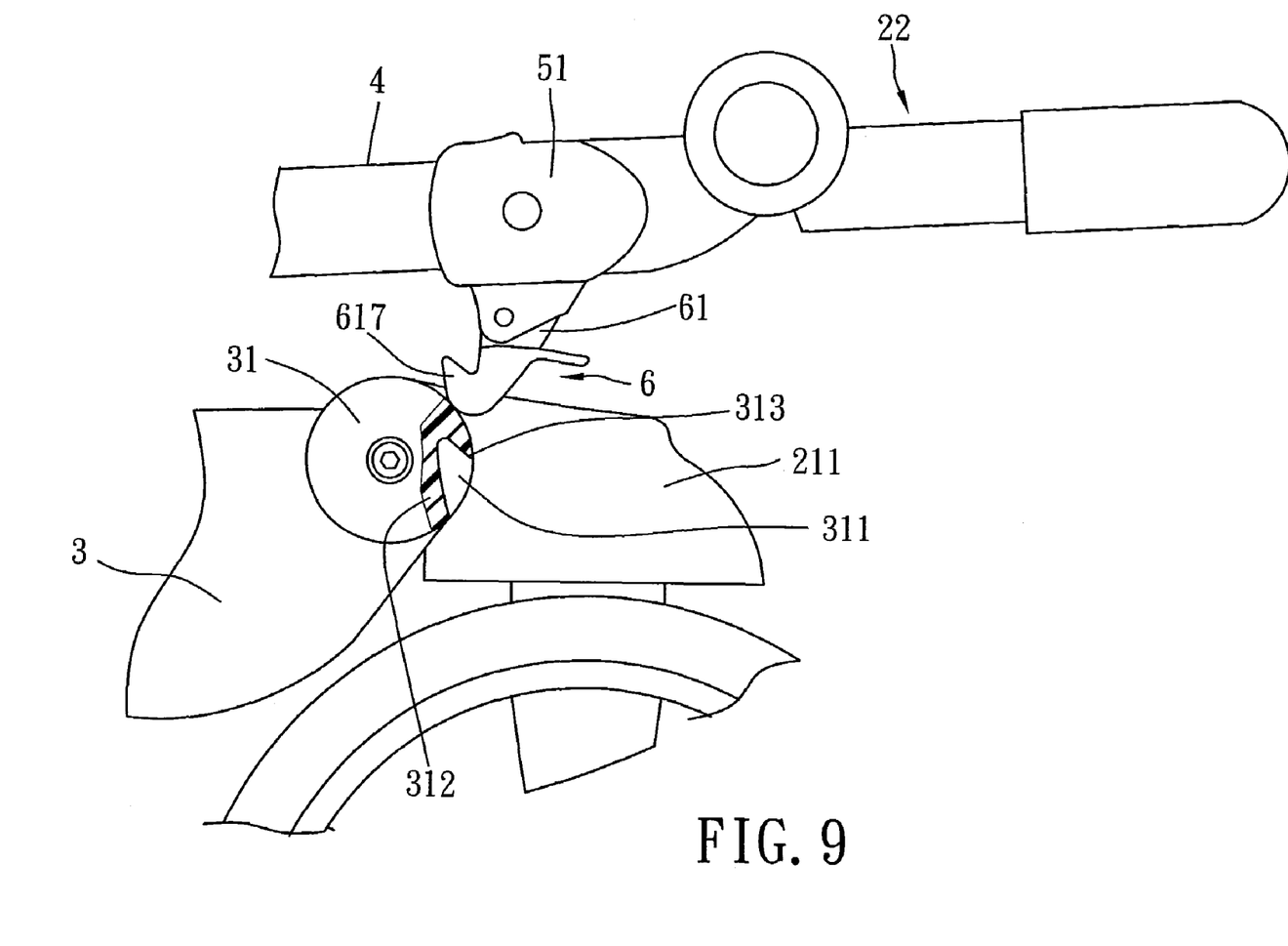
FIG. 9 is a fragmentary, partly sectional side view of the preferred embodiment, illustrating the rod-retaining seat in a state of being engaged to a retaining groove.
Figure 10:
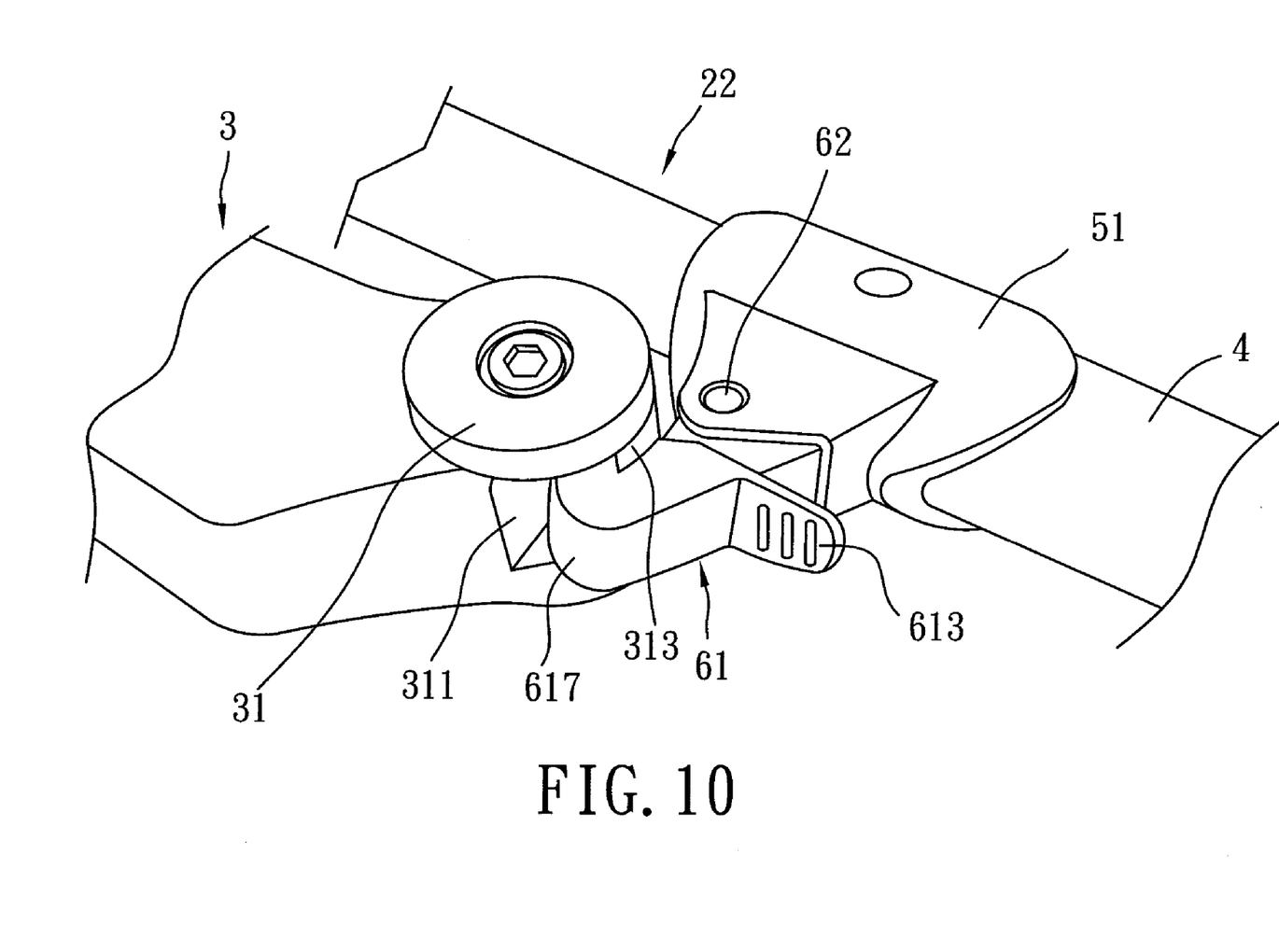
FIG. 10 is a fragmentary perspective view of the preferred embodiment, illustrating the rod-retaining seat in a state of engaging the retaining groove.

With additional reference to FIG. 9, when the grip member 4 pivots toward the swing rods 3, the hook ends 617 of the rod-retaining seats 61 come into slidable contact with the pivot ends 31 of the swing rods 3, respectively. When the hook ends 617 pass respectively through the retaining rods 313, they engage respectively the retaining grooves 311 in the swing rods 3 such that the retaining rods 313 engage respectively the engaging grooves 618 in the rod-retaining seats 61, as shown in FIG. 10. In this state, the swing rods 3 and the grip member 4 of the handle frame 22 are horizontal, and the retainer 252 engages automatically the handle-retaining seat 251 so as to prevent the grip member 4 from pivoting upwardly away from the swing rods 3. As a result, when the stroller is folded, the handle frame 22 is locked in a folded state, in which the grip member 4 is folded on the swing rods 3, as shown in FIG. 8. This facilitates packing and carrying of the stroller. Therefore, the object of this invention is achieved.

When the handle frame 22 is in the folded state, the first abutment surfaces 614 of the rod-retaining seats 61 abut respectively against the surrounding walls 511 of the slide sleeves 51.

When it is desired to unfold the stroller, the actuation portions 613 of the rod-retaining seats 61 are pushed respectively toward the slide sleeves 51 so as to remove the rod-retaining seats 61 respectively from the retaining grooves 311 in the swing rods 3. In addition, the retainers 252 are removed respectively from the handle-retaining seats 251. Thereafter, the grip member 4 is pulled upwardly. Hence, the stroller is converted into the unfolded state shown in FIG. 3 with the assistance of the strut mechanism 23 and the separating mechanism 24.

Advantageously, since the rod-retaining seats 61 are disposed respectively on the slide sleeves 51, and the retaining grooves 311 are formed respectively in the pivot ends 31 of the swing rods 3, the unfolding and folding of the handle frame 22 may be conveniently performed.

With this invention thus explained, it is apparent that numerous modifications and variations can be made without departing from the scope and spirit of this invention. It is therefore intended that this invention be limited only as indicated by the appended claims.

I claim:

1. A stroller comprising:
    a wheel frame; and
    a handle frame including
        two swing rods spaced apart from each other in a left-to-right direction, each of said swing rods having a retaining groove,
        two first pivot pins each connecting a corresponding one of said swing rods to said wheel frame,
        a grip member having two extension rod portions,
        two second pivot pins each connecting a corresponding one of said extension rod portions of said grip member to the corresponding one of said swing rods so as to allow said handle frame to be converted into a folded state, in which said grip member is folded on said swing rods, and
        two rod-retaining seats disposed on said grip member and pivotable to engage respectively and automatically said retaining grooves in said swing rods so as to prevent said grip member from pivoting upwardly away from said swing rods when said grip member is folded on said swing rods.

2. The stroller as claimed in claim 1, wherein said wheel frame includes a mounting seat, said swing rods being pivotable toward and away from said mounting seat, said stroller further comprising at least one retaining mechanism, said retaining mechanism including a handle-retaining seat attached to said mounting seat, and a retainer attached to one of said swing rods and pivotable to engage said handle-retaining seat so as to lock said stroller in a folded state when said swing rods are pivoted toward said mounting seat.

3. The stroller as claimed in claim 2, further comprising a strut mechanism for maintaining said stroller in an unfolded state, said handle frame further including two folding control mechanisms, each of which includes a slide sleeve disposed movably on the corresponding one of said extension rod portions of said grip member, said rod-retaining seats being disposed respectively on said slide sleeves, said slide sleeves being operable to activate said strut mechanism so as to allow for folding of said stroller.

4. The stroller as claimed in claim 3, wherein
    each of said slide sleeves includes a surrounding wall disposed around the corresponding one of said extension rod portions of said grip member; and
    said handle frame further includes:
        two pivot shafts each connecting a corresponding one of said rod-retaining seats to said surrounding wall of a corresponding one of said slide sleeves such that each of said rod-retaining seats is rotatable relative to said surrounding wall of the corresponding one of said slide sleeves between a sleeve-locking position whereat the corresponding one of said slide sleeves is locked on the corresponding one of said extension rod portions of said grip member, and a sleeve-releasing position whereat the corresponding one of said slide sleeves is released from the corresponding one of said extension rod portions of said grip member, and
        two resilient members each biasing a respective one of said rod-retaining seats toward said sleeve-locking position.

5. The stroller as claimed in claim 4, wherein
    said surrounding wall of each of said slide sleeves is formed with a retaining hole therethrough;
    each of said folding control mechanisms further includes a spring member having a retaining portion biased to engage said retaining hole in the corresponding one of said slide sleeves; and
    each of said rod-retaining seats includes:
        a sleeve-engaging portion disposed pivotally on a corresponding one of said slide sleeves,
        a hook portion extending from said sleeve-engaging portion, said hook portion engaging automatically said retaining groove in a corresponding one of said swing rods so as to lock said handle frame in the folded state when said handle frame is folded, and
        a pushing portion extending from said sleeve-engaging portion and pivotable into said retaining hole in the corresponding one of said slide sleeves so as to remove said retaining portion of a corresponding one of said spring members from said retaining hole in the corresponding one of said slide sleeves, thereby allowing for movement of the corresponding one of said slide sleeves on the corresponding one of said extension rod portions of said grip member.

6. The stroller as claimed in claim 5, wherein said sleeve-engaging portion of each of said rod-retaining seats has a first abutment surface that is in contact with said surrounding wall of the corresponding one of said slide sleeves when the corresponding one of said rod-retaining seats is disposed in said sleeve-locking position and that is removed from said surrounding wall of the corresponding one of said slide sleeves when the corresponding one of said rod-retaining seats is disposed in said sleeve-releasing position, and a second abutment surface that is in contact with said surrounding wall of the corresponding one of said slide sleeves when the corresponding one of said rod-retaining seats is disposed in said sleeve-releasing position and that is removed from said surrounding wall of the corresponding one of said slide sleeves when the corresponding one of said rod-retaining seats is disposed in said sleeve-locking position.

7. The stroller as claimed in claim 1, wherein each of said swing rods further has a pivot end connected to said wheel frame by a corresponding one of said first pivot pins, and a grip-connecting end opposite to said pivot end, said retaining grooves being formed respectively in said pivot ends of said swing rods, said handle frame further including two folding control mechanisms, each of which includes a slide sleeve disposed movably on a corresponding one of said extension rod portions of said grip member, said rod-retaining seats being disposed respectively on said slide sleeves, said slide sleeves being operable so as to allow for folding of said stroller.

8. The stroller as claimed in claim 1, wherein said first pivot pins are adjacent respectively to said retaining grooves in said swing rods.

* * * * *